(No Model.)
A. SCHÖRKE.
APPARATUS FOR PRESERVING ALIMENTARY SUBSTANCES.
No. 599,534. Patented Feb. 22, 1898.
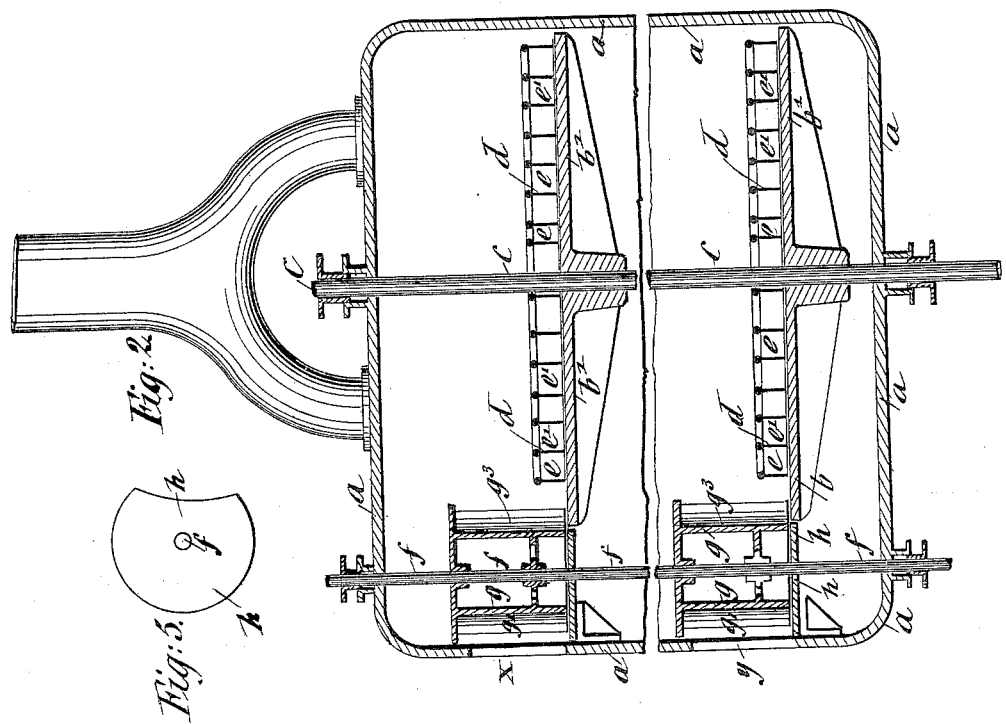
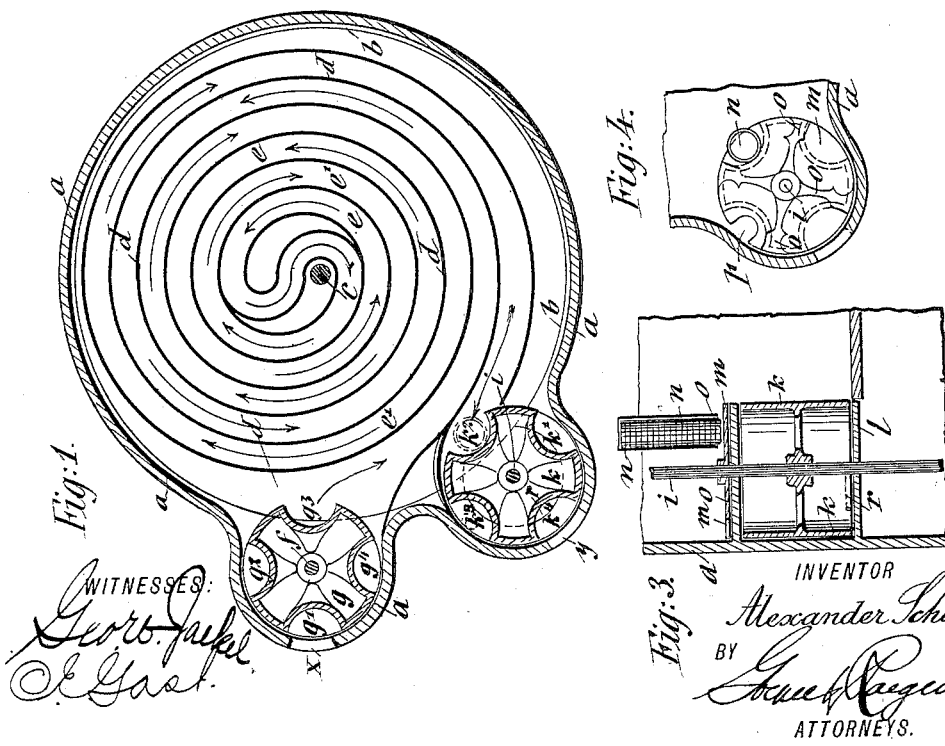
WITNESSES:
INVENTOR
Alexander Schörke
BY
ATTORNEYS.

UNITED STATES PATENT OFFICE.

ALEXANDER SCHÖRKE, OF DRESDEN, GERMANY.

APPARATUS FOR PRESERVING ALIMENTARY SUBSTANCES.

SPECIFICATION forming part of Letters Patent No. 599,534, dated February 22, 1898.

Application filed May 14, 1897. Serial No. 636,448. (No model.) Patented in Germany August 22, 1894, No. 90,097, and in France April 30, 1896, No. 255,987.

*To all whom it may concern:*

Be it known that I, ALEXANDER SCHÖRKE, a citizen of the Kingdom of Prussia, residing at Dresden, in the Kingdom of Saxony, in the Empire of Germany, have invented certain new and useful Improvements in Apparatus for Preserving Alimentary Substances, (for which I have obtained Letters Patent in Germany, No. 90,097, dated August 22, 1894, and in France, No. 255,987, dated April 30, 1896,) of which the following is a specification.

This invention relates to an improved apparatus for preserving alimentary substances in cans, bottles, and other vessels; and its object is to conduct the vessels containing the alimentary substances continuously through a closed space, in which they are subjected to a treatment by which the preserving is produced, after which they are hermetically closed; and it consists in an apparatus which comprises a receiver, a rotary table in the same, a feeder arranged adjacent to the charging end, a discharger arranged adjacent to the discharging end, and a suitable channel or conduit arranged above the table and connecting the feeder and discharger.

The preservation of the alimentary substances during their passage through the closed chamber can be accomplished by any known and approved method—as, for instance, evacuating the receptacle, or by introducing steam, air, or gas under pressure into said vessel and subjecting the same simultaneously to the influence of high or low temperatures or to action of the electric current, so that the germs of fermentation are killed, after which the atmospheric air is drawn off from a second chamber and such gases as have preservative properties, such as carbonic acid or hydrogen, pressed in the same. The advantages are that large quantities can be automatically and continuously treated for preservation with perfect uniformity and permanence and with the retention of all the natural properties of the alimentary substances, and, lastly, that several processes, even pasteurizing and sterilizing, can be carried out in the same apparatus.

The accompanying drawings show one form of apparatus for carrying out my improved process, in which—

Figure 1 is a horizontal section on line 1 1, Fig. 2. Fig. 2 is a longitudinal section of my improved apparatus, while Figs. 3, 4, and 5 are details of the same.

Similar letters of reference indicate corresponding parts.

My improved apparatus for treating alimentary substances for preserving the same in cans, bottles, &c., consists of a hermetically-closed receiver $a$, in which one or more horizontal tables $b$ $b'$ are arranged, each applied by central hubs to a vertical shaft $c$, which can be slowly or quickly rotated, as required. On each disk $b$ $b'$ is arranged a double spiral $d$, the center of which does not coincide with the center of the disks $b$ or $b'$. The double spiral is formed of parallel walls of suitable height, and the channels $e$ $e'$ therein are terminated at their outer ends by rotary bodies $g$ and $k$, which are applied, respectively, to vertical axes $f$ and $i$, which turn, like the shaft $c$, in suitable stuffing-boxes of the receiver $a$ and receive rotary motion from suitable power transmission. The rotary bodies $g$ and $k$ are provided, respectively, with semicircular, or nearly semicircular, recesses $g'$ to $g^4$ and $k'$ to $k^4$ and rotate over stationary disks $h$ $l$, fixed in a suitable way to the receiver, and which are located in the same plane as the rotary disks $b$ $b'$. Above the rotary bodies $g$ and $k$ are arranged stationary disks $m$, which are likewise provided with similar openings to the side walls of the said bodies, above which bodies are arranged recessed disk-shaped carriers $o$, that are applied to the shafts $f$ and $i$, and above which is arranged a supply-tube $n$ for the covers of the cans or other vessels. After the receiver $a$ is evacuated to a certain degree of vacuum a rotary motion is imparted thereto, and at the same time the temperature in the same lowered to from 30° to 45° centigrade. The properly-prepared cans, bottles, &c., are then introduced through the inlet-opening $x$ in the receiver successively to the recesses of the rotary body $g$ and transferred by the same automatically to the table $b$. This body $g$ may hence be termed a "feeder." By the rotation and friction of the table $b$, as well as by the eccentricity of the two-wall spiral conductor $d$, the vessels are moved with comparatively little friction through the convolutions of the spiral conductor until they arrive near the shaft c, whence they are moved through the S-shaped bend, which connects the ingoing spiral channel e with the outgoing spiral channel e', and finally into one of the recesses of the rotary body k, by which they are taken up and conducted to the outlet-opening y. This body k may hence be called a "discharger." Before they are delivered to the outlet-opening y the cans, bottles, &c., are passed below the tube n, through which the covers are supplied, which are taken along one after the other by the recessed disk-shaped carrier o and moved forward, so as to be dropped at the proper moment through the opening p in the stationary plate m, Fig. 4, onto the vessels carried along by the rotary body k. While the rotary body g, by means of which the cans are introduced into the receiver, receives a uniform motion the rotary body k receives an intermittent or step-by-step motion, so that during the dropping of the cover on a can or other vessel the motion of the body k is temporarily interrupted, so that the cover may be pressed onto the vessel by a suitable lever operated from the outside of the receiver. (Not shown in the drawings.) The stationary disk l, below the outgoing body k, is provided with a guide-groove for the can or vessel, so that the opening p in the stationary top plate m corresponds exactly with the position of the can or vessel when it arrives below the same.

The apparatus is operated in the same manner when it is necessary to subject the alimentary substances to pressure and a high rise of temperature, or to treatment with preservative gases, or to treatment by any other suitable method.

The receiver a may be provided with means for removing the vessels after they pass through the same, also with light and testing openings, means for transmitting power to the different shafts, and other known accessories.

In connection with the rotary outgoing body k a second receiver may be hermetically connected, in which case the device for closing the vessels is dispensed with and the vessels removed in open condition to the disks of the second receiver, which are moved in opposite directions to those of the first receiver and in which the alimentary substances can be eventually treated in an entirely different manner than in the first receiver, they being closed at the outgoing end of the same in the manner before described.

Having thus described my invention, I claim as new and desire to secure by Letters Patent—

1. An apparatus for preserving alimentary substances in vessels, consisting of a receiver, a rotary table in the same, a rotary feeder, and a rotary discharger, and means for leading the vessels from the feeder to the discharger along the rotary table, substantially as set forth.

2. An apparatus for preserving alimentary substances in vessels, consisting of a receiver, a rotary table in the receiver, a feeder, a discharger, and a double spiral conductor on the rotary table, the ingoing and outgoing spirals of said conductor being respectively connected with the feeder and discharger, substantially as set forth.

3. An apparatus for preserving alimentary substances in vessels, consisting of a receiver, a rotary table in the same, a rotary feeder, a rotary discharger, a double spiral conductor on the rotary table provided at its inner part with a reversing bend or curve, ingoing and outgoing spirals of said conductor being connected respectively with the feeder and discharger, substantially as set forth.

4. The combination of a closed receiver, a rotary table in the same, a double spiral conveyer on said table, a rotary feeder provided with recesses communicating with the ingoing spiral, a rotary discharger provided with recesses and connected with the outgoing spiral, said spirals being connected at their inner ends by a reversing curve, stationary disks above and below said rotary feeder and discharger, the top disk of the discharger having a recess, a supply-tube for the covers, and a recessed carrier-disk for conducting said covers to the recess in the top disk so as to drop them successively on the vessels in the discharger, substantially as set forth.

In testimony that I claim the foregoing as my invention I have signed my name in presence of two subscribing witnesses.

, ALEXANDER SCHÖRKE.

Witnesses:
HERNANDO DE SOTO,
PAUL ARRAS.